(12) United States Patent
Nedrelow

(10) Patent No.: US 10,901,459 B1
(45) Date of Patent: Jan. 26, 2021

(54) MOBILE COMPUTING DEVICE CASE AND WORKSTATION MAT

(71) Applicant: Scott Nedrelow, Willmar, MN (US)

(72) Inventor: Scott Nedrelow, Willmar, MN (US)

(*) Notice: Subject to any disclaimer, the term of this patent is extended or adjusted under 35 U.S.C. 154(b) by 0 days.

(21) Appl. No.: 17/004,954

(22) Filed: Aug. 27, 2020

(51) Int. Cl.
| H05K 1/16 | (2006.01) |
| G06F 1/16 | (2006.01) |
| A45C 11/00 | (2006.01) |

(52) U.S. Cl.
CPC ............ *G06F 1/1628* (2013.01); *A45C 11/00* (2013.01); *A45C 2011/003* (2013.01); *G06F 2200/1633* (2013.01)

(58) Field of Classification Search
CPC ........................... A45C 11/00; A45C 2011/003
See application file for complete search history.

(56) References Cited

U.S. PATENT DOCUMENTS

| 7,277,081 | B2* | 10/2007 | Ukita | G06F 1/1616 |
| | | | | 345/156 |
| D576,785 | S * | 9/2008 | TerMeer | D3/201 |
| 8,235,208 | B2* | 8/2012 | Sirichai | A45C 11/00 |
| | | | | 206/320 |
| 8,567,578 | B2* | 10/2013 | Cuong | A45F 5/00 |
| | | | | 190/107 |
| 9,474,345 | B2* | 10/2016 | Smith | G06F 1/1626 |
| 9,750,321 | B2* | 9/2017 | Kandel | A45C 13/02 |
| 2005/0098594 | A1* | 5/2005 | Truong | B60R 11/0264 |
| | | | | 224/275 |
| 2006/0144662 | A1* | 7/2006 | Hu | A45C 13/02 |
| | | | | 190/110 |
| 2010/0116860 | A1* | 5/2010 | Tello | G06F 1/163 |
| | | | | 224/576 |
| 2014/0216954 | A1* | 8/2014 | Law | A45F 5/02 |
| | | | | 206/45.23 |
| 2014/0274204 | A1* | 9/2014 | Williams | H04B 1/3888 |
| | | | | 455/556.1 |
| 2018/0317572 | A1* | 11/2018 | Guttman | A41D 13/005 |

OTHER PUBLICATIONS

Web page printed Sep. 30, 2020, https://www.nedrelow.com/products/together-sleeve-charcoal?variant=1942935132576, 17 pages.

(Continued)

*Primary Examiner* — Xanthia C Cunningham
(74) *Attorney, Agent, or Firm* — Patterson Thuente Pedersen, P.A.

(57) ABSTRACT

A protective folio sleeve configured to transition from a flat, open desk mat configuration to a sealed pouch configuration. The protective folio sleeve including a first flexible panel and a second flexible panel, and a plurality of magnets, with half of the plurality of magnets arranged on one side of a fold line and the other half of the plurality of magnets arranged an opposing side of the fold line, wherein a polarity of each magnet on one side of the fold line is opposite to a polarity of a corresponding magnet on the opposing side of the fold line, and wherein the polarity of each magnet in the line of magnets is opposite to a polarity of an adjacent magnet in the line of magnets, such that collectively the plurality of magnets are configured to passively align and attract edges of the protective folio sleeve.

12 Claims, 10 Drawing Sheets

(56) References Cited

OTHER PUBLICATIONS

Web page printed Sep. 30, 2020, https://www.nedrelow.com/products/wool-felt-zipper-pouch?variant=31203367682113, 4 pages.
Web page printed Sep. 30, 2020, , https://www.nedrelow.com/products//magic-sleeve?variant=31842686926913, 17 pages.
Web page printed Sep. 30, 2020, https://www.youtube.com/watch?v=WOMBL13Y0LY, 1 page.
Web page printed Sep. 30, 2020, https://www.youtube.com/watch?v=keb0fBTTpP8, 1 page.
Web page printed Sep. 30, 2020, https://woolie.shop/products/woolie-magnetic-sleeve, 4 pages.

* cited by examiner

FIG. 4A  FIG. 4B

MOBILE COMPUTING DEVICE CASE AND WORKSTATION MAT

TECHNICAL FIELD

The present disclosure relates generally to protective cases for mobile computing devices, and more particularly to a protective case configured to transition between a sealed pouch configuration and a desk pad configuration.

BACKGROUND

Since the development of mobile computing devices (e.g., smart phones, tablets, portable computers, etc.) there has been a need for protective cases to shield the mobile computing devices, particularly during transport and storage. Over the years, Applicant of the present disclosure has developed a number of such protective cases, including various types of sleeves and zipper pouches.

With reference to FIG. 1A, one type of sleeve 102 (commercially referred to as the Sleeve Max™), features a back panel 104 stitched to a front panel 106 about three perimeter edges 108A-C, thereby creating an open pocket 110 into which a mobile computing device and/or other accessories can be placed. Often such sleeves 102 are constructed of a felt wool fabric. Felt wool is known to be both water and stain resistant, and as an excellent material to both provide a protective cushion as well as a soft, scratch inhibiting surface, particularly for devices with exposed touchscreens which may be slid into and out of the pocket 110.

With its particularly clean lines and overall simplicity, such sleeves 102 have been described as adhering to a minimalist design, while at the same time making use of natural wool materials which are soft to the touch, thereby giving the sleeves 102 a cozy aspect. Unfortunately, with the pocket 110 left open on one side, occasionally the contents of the sleeve 102 may unintentionally fall out of the pocket 110 during transport.

With this concern in mind, Applicant of the present disclosure developed another type of protective case referred to as a zipper pouch. With reference to FIG. 1B, the zipper pouch 112 features a construction similar to that of the sleeve 102, in that it typically includes a felt wool back panel 114 stitched to a felt wool front panel 116. However, unlike the sleeve 102, the zipper pouch 112 includes stitching around its entire perimeter 118. A zipper 120 is positioned on the front panel 116, enabling the pocket defined between the front panel 116 and the back panel 114 to be selectively sealed, thereby significantly decreasing the likelihood of contents positioned in the pocket from unintentionally slipping out of the pocket during transport.

Although the zipper 120 performs the important function of selectively sealing the pocket, its presence adds a certain unnatural complexity to the protective case, which generally detracts from the minimalist design. Although zippers 120 with rounded edges are typically used, the zippers 120, which are constructed of a rigid material, can present a scratch hazard to the screens of certain types of mobile computing devices. Moreover, with any type of pocket type protective case, lint, dirt and other debris often accumulates within the pocket. With the pocket being open on only a single edge, complete removal of the debris from the pocket can be difficult. In some cases, the debris can present a scratch hazard and/or can interfere with the electrical port connections of a mobile computing device positioned within the pocket.

The present disclosure addresses these concerns.

SUMMARY OF THE DISCLOSURE

Embodiments of the present disclosure provide a protective case which adheres to a minimalist design through the use of simple, clean lines without the presence of a zipper or other fastener, while enabling contents positioned within the protected case to be securely contained within an enclosure sealed about its entire peripheral edge. Further, embodiments of the present disclosure provide a protective case which can transition between a sealed pouch configuration and a flat, open desk mat configuration, thereby enabling ease in cleaning of surfaces of the protective case which may come into contact with the contents selectively sealed therein. Moreover, embodiments of the present disclosure enable an easy one step, passive sealing closure of the protective case, such that as a user folds the protective case from the open configuration to the sealed pouch configuration, the protective case passively seals itself along three edges to form a sealed compartment with a fourth folded edge.

One embodiment of the present disclosure provides a method of constructing a protective folio sleeve, comprising: cutting a first panel and a second panel from a stock of material; adhering a plurality of magnets to a flexible ribbon; adhering the flexible ribbon in proximity to a perimeter of the first panel; and stitching the first panel and a second panel together to form a unitary pad. In some embodiments, the first panel and the second panel can be cut in a rectangular shape having a first half and a second half bisected by a fold line. In some embodiments, the stock of material can be a non-woven material having a thickness of between about one millimeter and about four millimeters. In some embodiments, the plurality of magnets can be adhered to the flexible ribbon to form six lines of magnets, which can be adhered in proximity to a perimeter of the first panel, such that three lines of magnets are positioned on the first half of the first panel and the other three lines of magnets are positioned on the second half of the first panel. In some embodiments, a total number of the plurality of magnets can include an even number of magnets, with half of the plurality of magnets arranged on one side of the fold line and the other half of the plurality of magnets arranged on an opposing side of the fold line, wherein a polarity of each magnet on one side of the fold line is opposite to a polarity of a corresponding magnet on the opposing side of the fold line, and wherein the polarity of each magnet in the line of magnets is opposite to a polarity of an adjacent magnet in the line of magnets, such that collectively the plurality of magnets are configured to passively align and attract edges of the unitary pad as the unitary pad transitions from a flat, open desk mat configuration to a sealed pouch configuration.

Another embodiment of the present disclosure provides a protective folio sleeve configured to transition from a flat, open desk mat configuration to a sealed pouch configuration, comprising: a first flexible panel and a second flexible panel, wherein the first flexible panel and the second flexible panel are formed in a rectangular shape having a first half and a second half bisected by a fold line, the first flexible panel and the second flexible panel comprised of a non-woven material having a thickness of between about one millimeter and about four millimeters; a plurality of magnets adhered to a flexible ribbon to form six lines of magnets, the six lines of magnets positioned between the first panel and the second panel in proximity to a perimeter of the first and second flexible panels to collectively form a unitary pad, wherein three lines of magnets are positioned on the first half of the first and second flexible panels and the other three lines of magnets are positioned on the second half of the first and second flexible panels, wherein a total number of the plurality of magnets comprises an even number of magnets, with half of the plurality of magnets arranged on one side of the fold line and the other half of the plurality of magnets arranged on the opposing side of the fold line, wherein a polarity of each magnet on one side of the fold line is opposite to a polarity of a corresponding magnet on the opposing side of the fold line, and wherein the polarity of each magnet in the line of magnets is opposite to a polarity of an adjacent magnet in the line of magnets, such that collectively the plurality of magnets are configured to passively align and attract edges of the unitary pad as the unitary pad transitions from the flat, open desk mat configuration to the sealed pouch configuration.

In one embodiment, the stock of material can include at least one of wool felt, polyester felt, or leather. In one embodiment, the magnets can be N52 grade magnets. In one embodiment, the magnets can be bar magnets measuring about 1 inch long by about ¼ inch wide, with a depth of about 1/16 of an inch. In one embodiment, the flexible ribbon can be an industrial carpet tape. In one embodiment, the first panel and the second panel can be stitched together with a polyester thread.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 4A is a plan view depicting the protective folio sleeve of FIG. 3A in the open desk mat or pad configuration, in accordance with an embodiment of the disclosure.

FIG. 4B is a first profile view depicting the protective folio sleeve of FIG. 4A, in accordance with an embodiment of the disclosure.

Figure 1A:
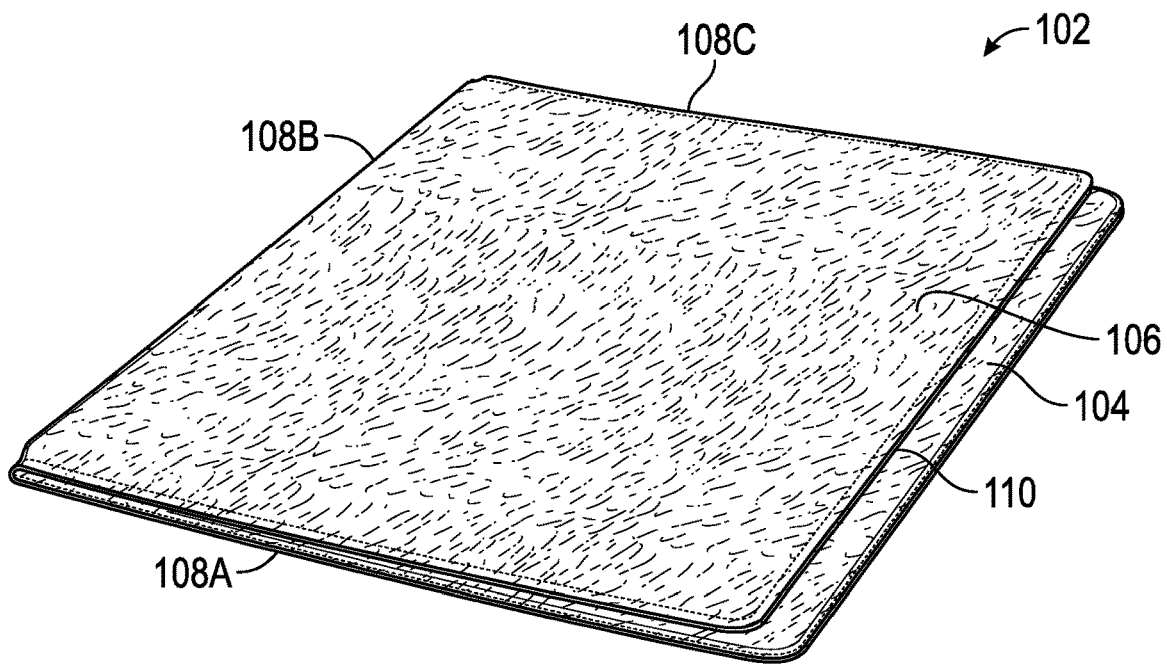
FIG. 1A is a perspective view depicting a sleeve type protective case, in accordance with the prior art.
Figure 1B:
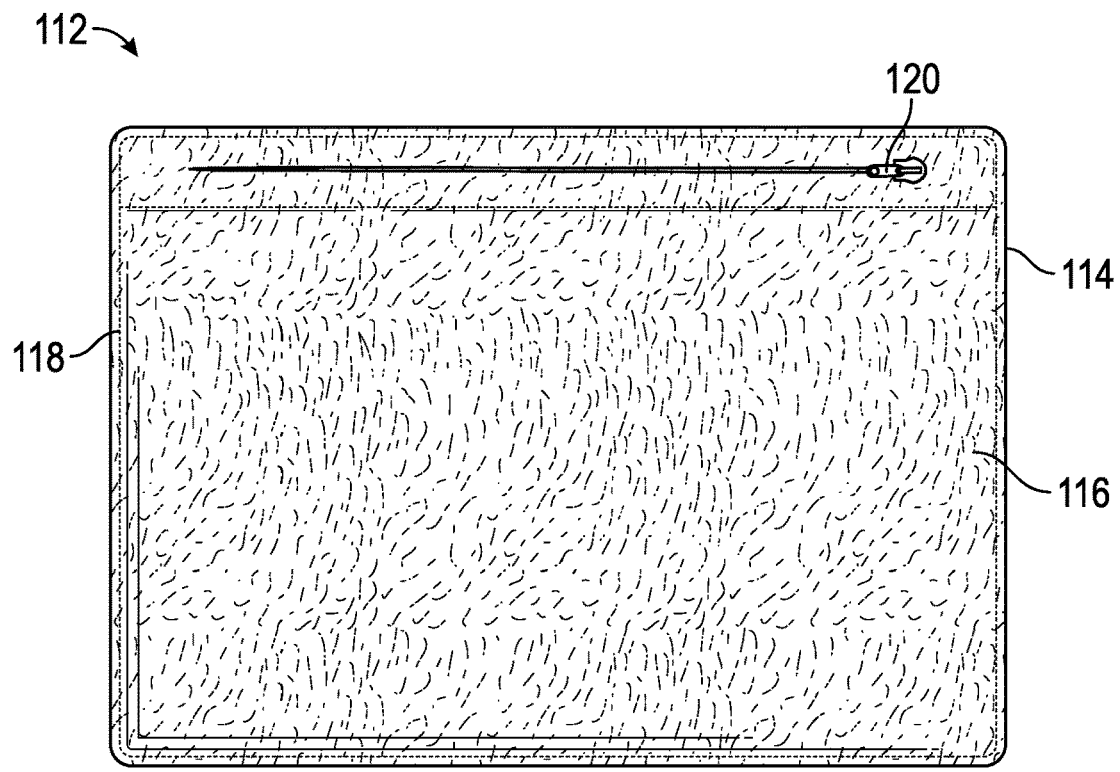
FIG. 1B is a perspective view depicting a zipper pouch type protective case, in accordance with the prior art.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2A:
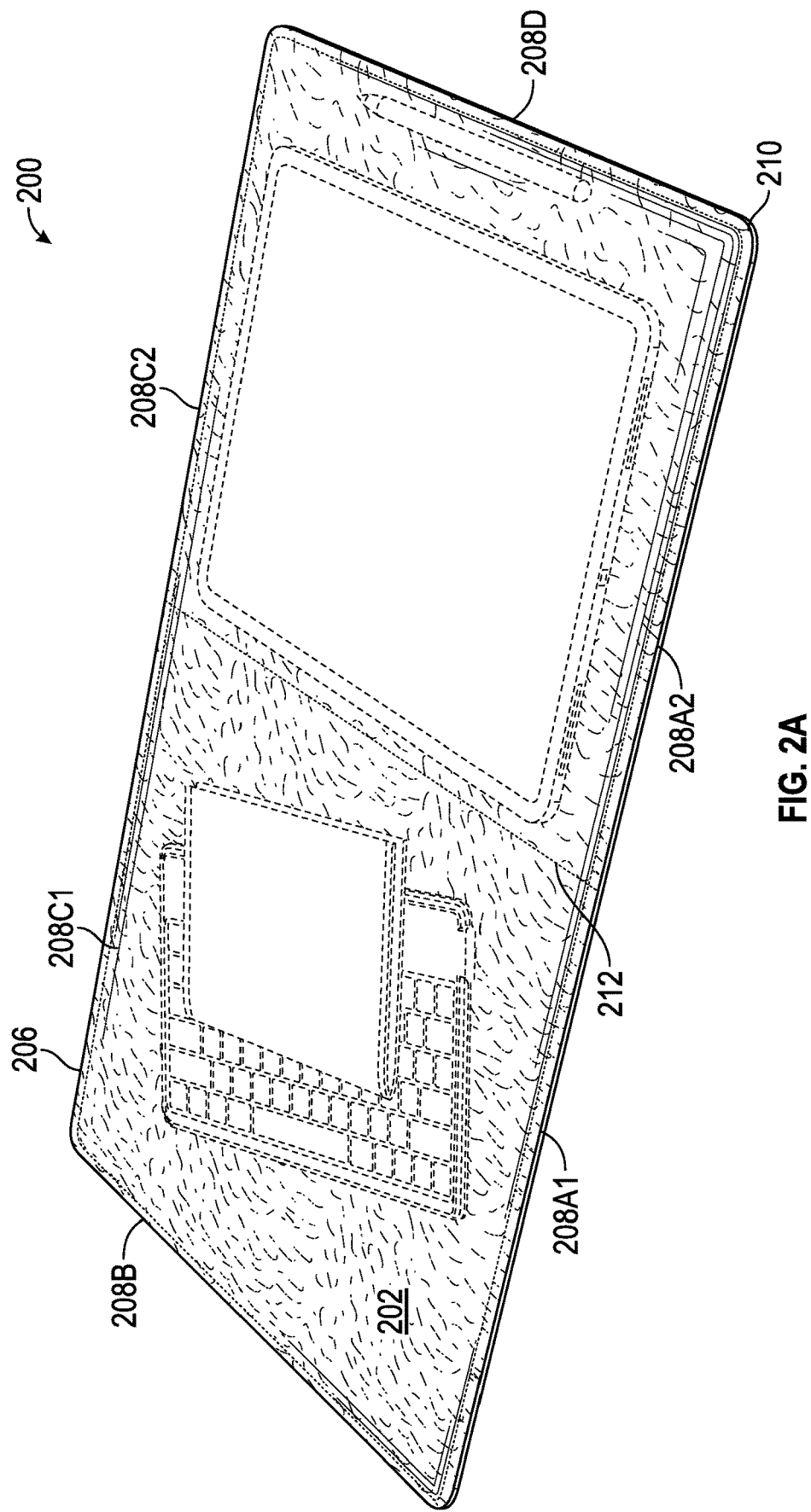
FIG. 2A is a perspective view depicting a protective folio sleeve in a flat, open desk mat or pad configuration, in accordance with an embodiment of the disclosure.
Figure 2B:
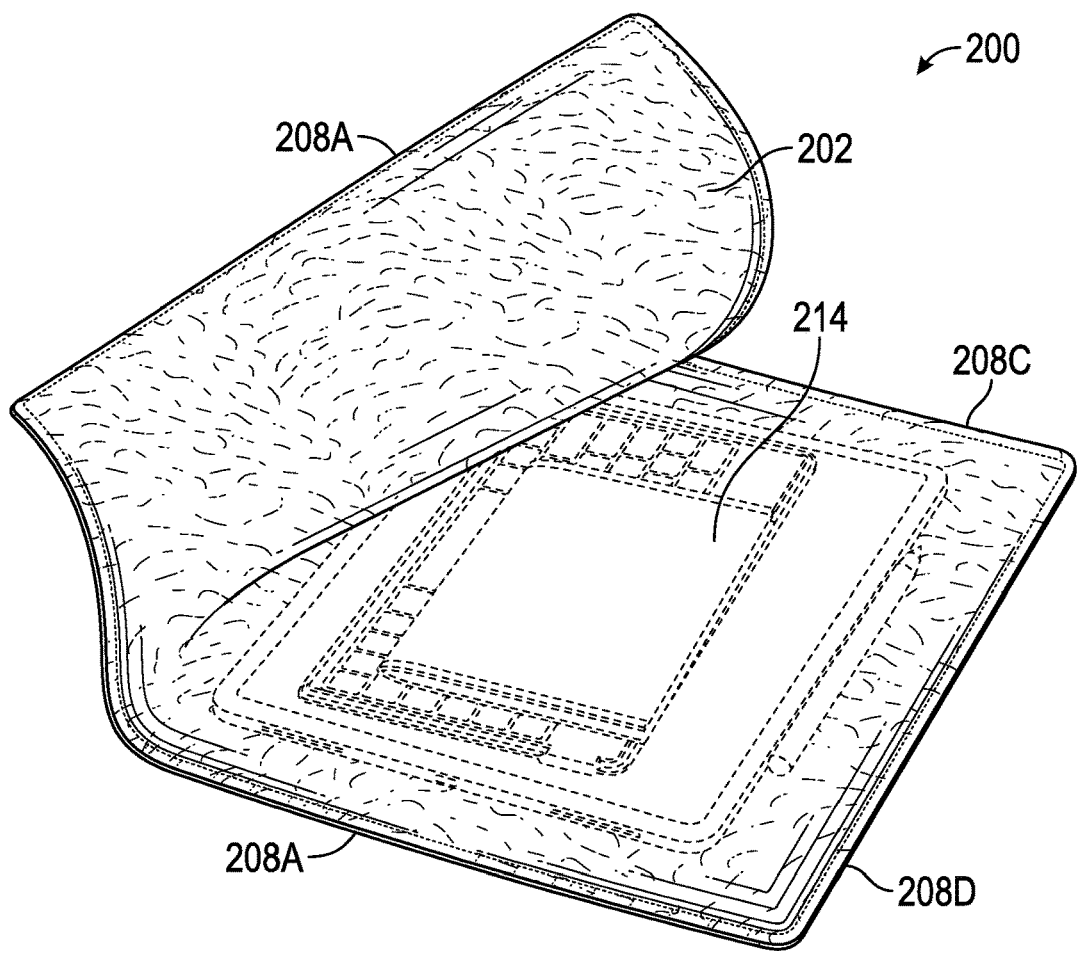
FIG. 2B is a perspective view depicting the protective folio sleeve of FIG. 2A in transition between the flat, open desk mat or pad configuration and a sealed folio or pouch configuration, in accordance with an embodiment of the disclosure.
Figure 2C:
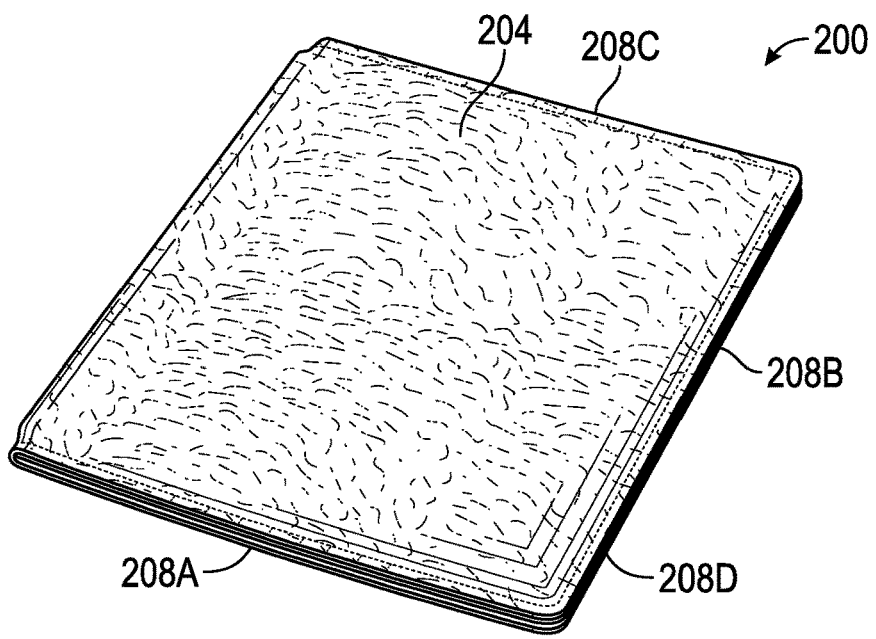
FIG. 2C is a perspective view depicting the protective folio sleeve of FIG. 2B in the sealed folio or pouch configuration, in accordance with an embodiment of the disclosure.

Referring to FIGS. 2A-B, perspective views of a protective folio sleeve 200 are depicted in accordance with an embodiment of the disclosure. In some embodiments, the protective folio sleeve 200 can be configured to transition from a flat, open desk mat or pad configuration (as depicted in FIG. 2A), to a sealed folio or pouch configuration (as depicted in FIG. 2C). FIG. 2B depicts the protective folio sleeve in transition between the desk mat configuration and the sealed pouch configuration, as the protective folio sleeve 200 passively seals itself along a peripheral edge. Accordingly, the protective folio sleeve 200 combines a folio sleeve and a desk mat into a single, unitary device which serves as both a carryall or container for the selective transport of articles contained within the folio sleeve 200, while enabling quick and easy conversion into a comfortable workstation on which the articles can be used.

In one embodiment, the protective folio sleeve can include an interior surface 202, an exterior surface 204, and a perimeter 206 defined by the plurality of edges 208A-D. For example, in one embodiment, the perimeter 206 can include four edges 208A-D to generally form a rectangular shape; although other geometric and non-geometric configurations are also contemplated. In some embodiments, one or more corners 210 defined by the perimeter 206 can be filleted to generally match the rounded edges of many portable computing devices as well as to present a more finished appearance. Various embodiments of the present invention will be described in detail with reference to the drawings, wherein like reference numerals represent like parts and assemblies throughout the several views. Additionally, it should be appreciated that, depending on the desired configuration of the interior and exterior surfaces 202, 204 can be alternated so that the interior surface 202 becomes the exterior surface 204, and the exterior surface 204 becomes the interior surface 202.

In some embodiments, the perimeter 206 of the protective folio sleeve 200 can optionally be lined with a magnetic material. For example, in one embodiment, edges 208A1, 208B and 208C1 can be lined with a magnetic material having a magnetic field with the polarity oriented in a first direction, while edges 208A2, 208D and 208C2 can be lined with a magnetic material having a magnetic field with a polarity oriented in the opposite direction, such that edges 208A1, 208B and 208C1 are naturally attracted to edges 208A2, 208D and 208C2 and vice versa. Accordingly, as the protective folio sleeve 200 is generally folded along a fold line 212, the protective folio sleeve 200 transitions from the desk mat configuration to the sealed pouch configuration, the magnetic material passively seals edges 208A1, 208B and 208C1 to 208A2, 208D and 208C2, thereby sealing articles (e.g., a portable computing device, pen or stylus, keyboard, notebook, etc.) within a pocket 214 defined by the protective folio sleeve 200 in the sealed pouch configuration. While in the open desk mat configuration, the magnetic material can serve as an aid to keep a ferritic or other magnetic article (e.g., a stylus) in place relative to the protective folio sleeve 200.

Figure 3A:
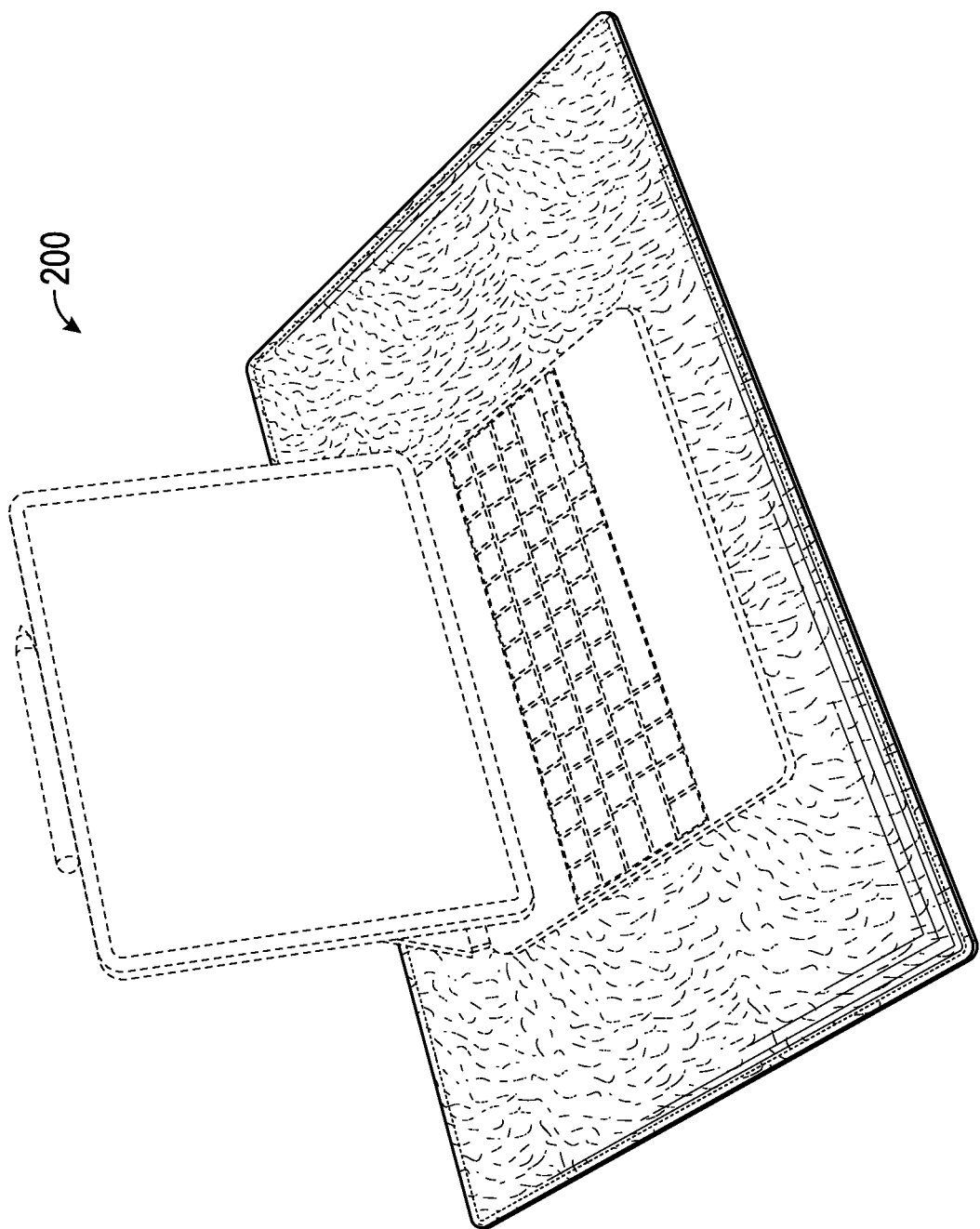
FIG. 3A is a perspective view depicting a protective folio sleeve in a flat, open desk mat or pad configuration, in accordance with an embodiment of the disclosure.
Figure 3B:
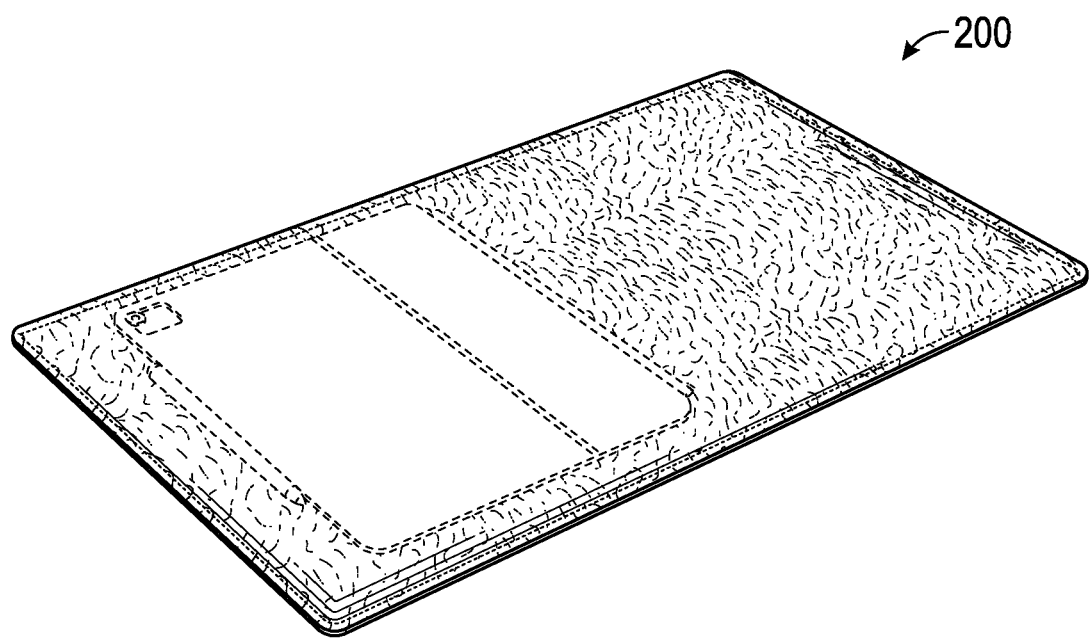
FIG. 3B is an alternate perspective view depicting the protective folio sleeve of FIG. 3A in the flat, open desk mat or pad configuration, in accordance with an embodiment of the disclosure.
Figure 3C:
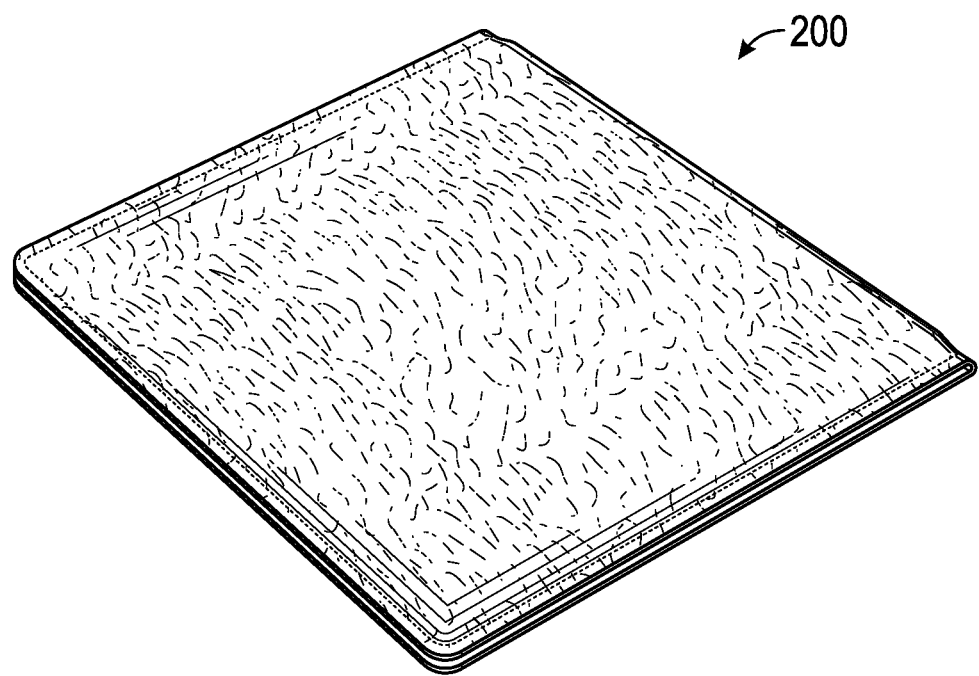
FIG. 3C is a perspective view depicting the protective folio sleeve of FIG. 3B in a sealed folio or pouch configuration, in accordance with an embodiment of the disclosure.
Figure 4C:
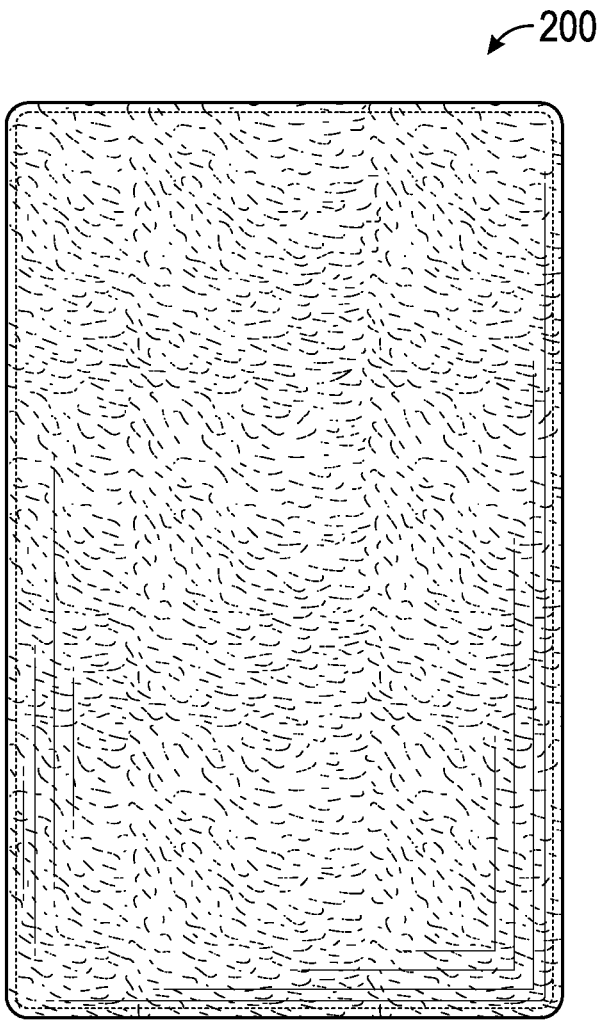
FIG. 4C is a second profile view depicting the protective folio sleeve of FIG. 4A, in accordance with an embodiment of the disclosure.
Figure 4C:
Figure 4C:
Figure 5A:
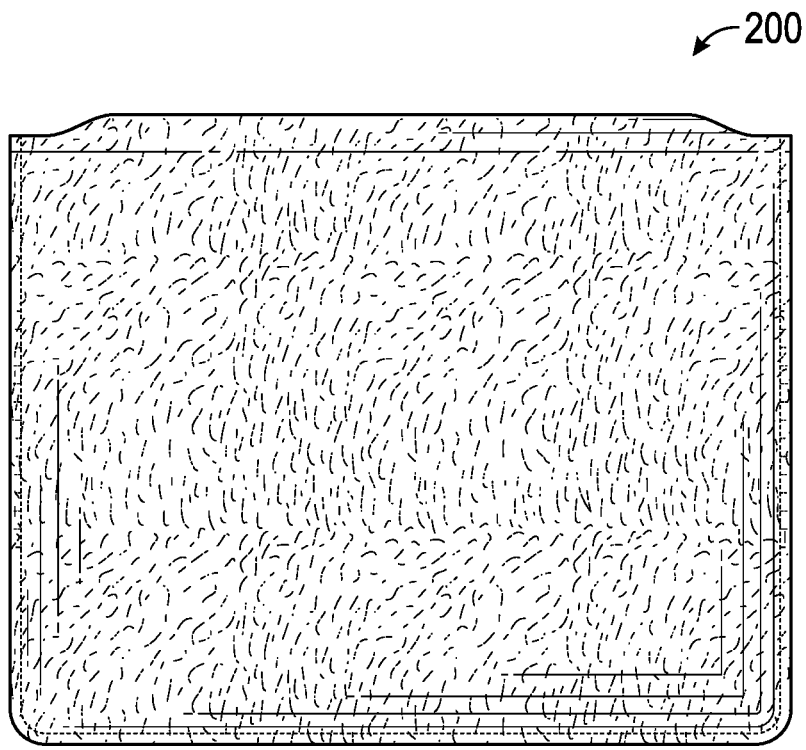
FIG. 5A is a plan view depicting the protective folio sleeve of FIG. 3C in the sealed folio or pouch configuration, in accordance with an embodiment of the disclosure.
Figure 5B:
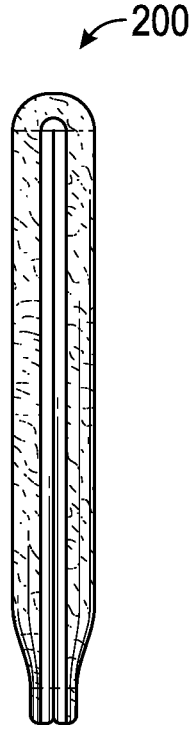
FIG. 5B is a first profile view depicting the protective folio sleeve of FIG. 5A, in accordance with an embodiment of the disclosure.
Figure 5C:
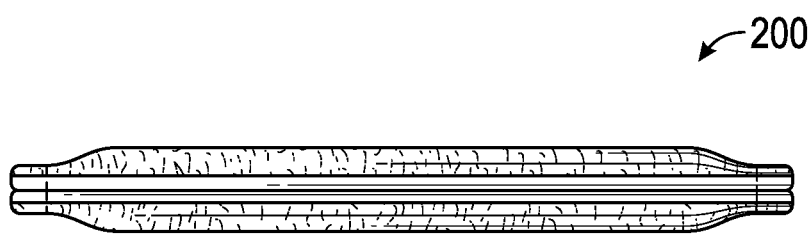
FIG. 5C is a second profile view depicting the protective folio sleeve of FIG. 5A, in accordance with an embodiment of the disclosure.

Referring to FIGS. 3A-C, additional perspective views of a protective folio sleeve 200 are depicted in accordance with an embodiment of the disclosure. In particular, FIGS. 3A-B depict the protective folio sleeve 200 in the flat, open desk mat configuration, while FIG. 3C depicts the portfolio sleeve 200 in the sealed pouch configuration. FIGS. 4A-C further depicts the protective folio sleeve 200 in the open desk mat configuration. In particular, FIG. 4A depicts a plan view of the protective folio sleeve 200, while FIGS. 4B & 4C depict profile views of the protective folio sleeve in the open desk mat configuration. FIGS. 5A-C further depicts the protective folio sleeve 200 in the sealed pouch configuration. In particular, FIG. 5A depicts a plan view of the protective folio sleeve 200, while FIGS. 5B & 5C depict profile views of the protective folio sleeve in the sealed pouch configuration.

Figure 7A:
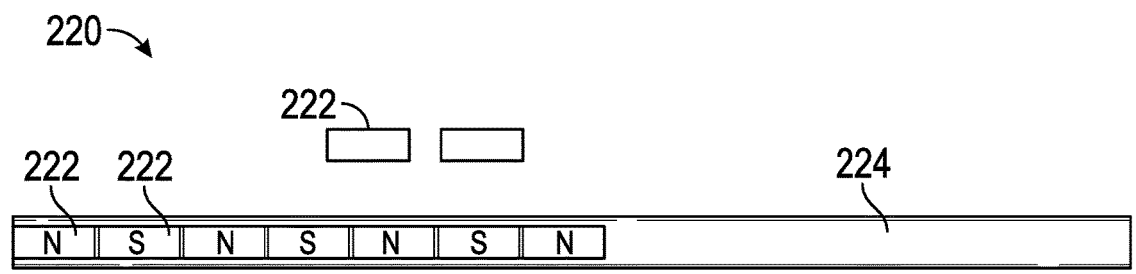
FIG. 7A is a schematic view depicting a step of adhering a plurality of magnets to a flexible ribbon, in accordance with an embodiment of the disclosure.
Figure 7B:
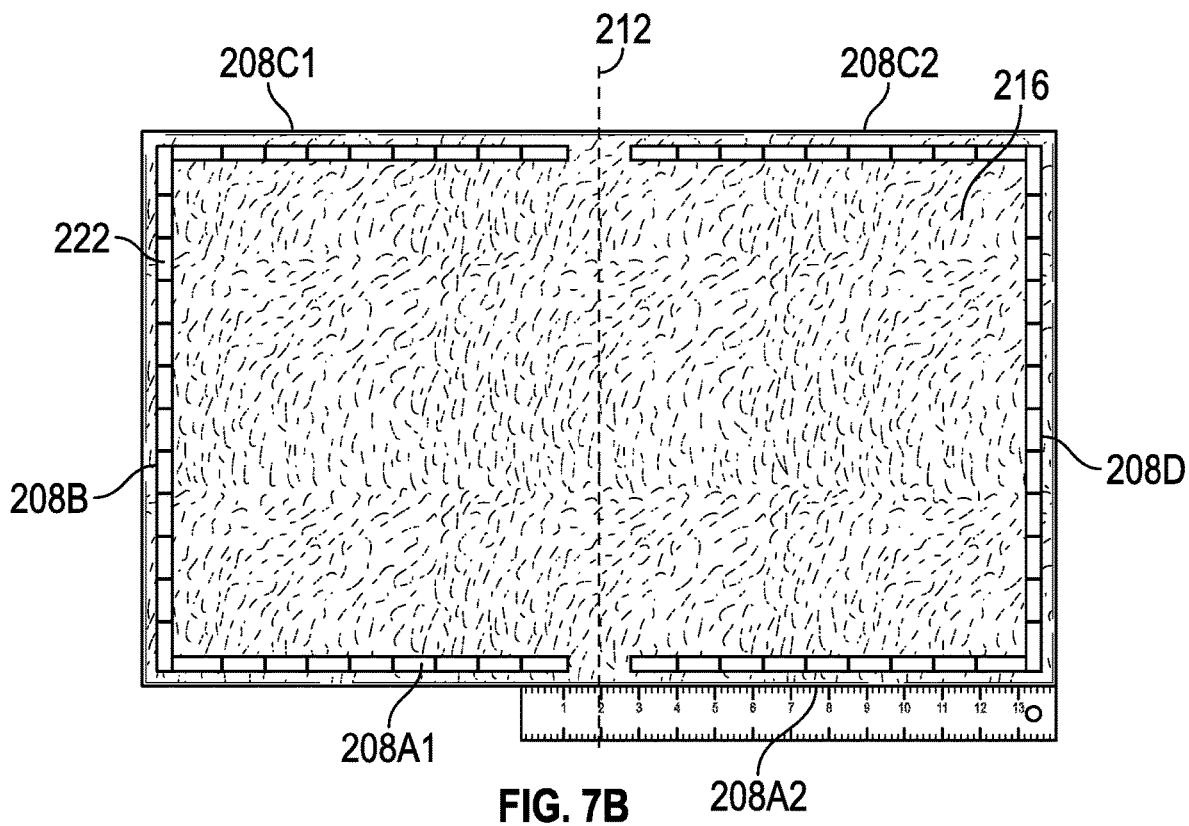
FIG. 7B is a schematic view depicting a step of adhering the flexible ribbon to a first panel, in accordance with an embodiment of the disclosure.
Figure 7C:
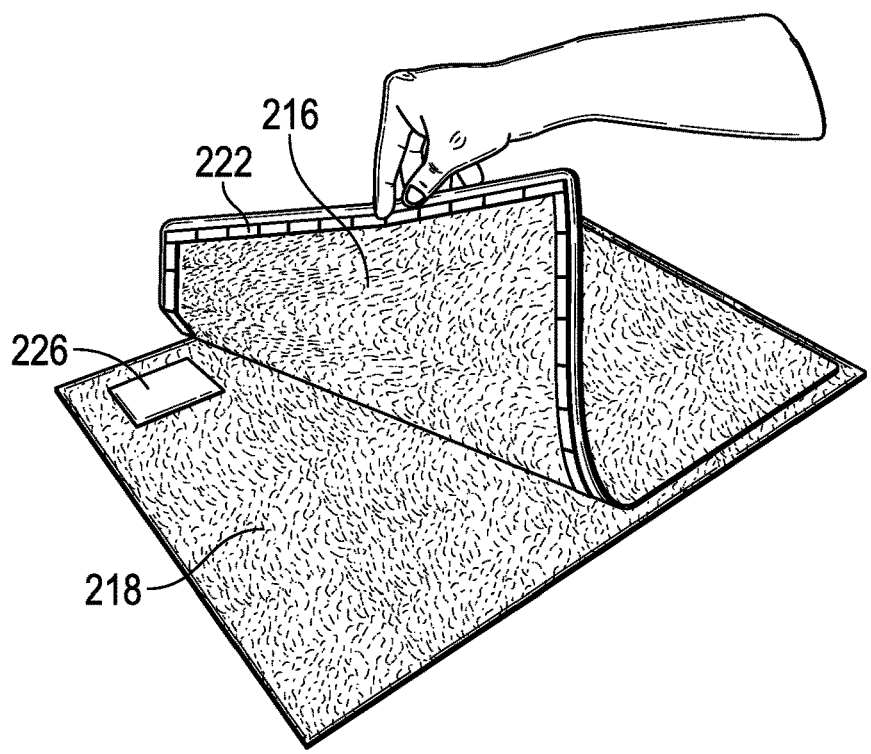
FIG. 7C is a schematic view depicting a step of positioning the first panel on top of a second panel, in accordance with an embodiment of the disclosure.

With reference to FIG. 5, a flowchart depicting a method 300 of creating a protective folio sleeve 200 is depicted in accordance with an embodiment of the disclosure. At S302, a first panel 216 and a second panel 218 of material (as depicted in FIG. 7C) can be cut to the approximate dimensions of the final protective folio sleeve 200 from a stock of material. In some embodiments, the material can be die cut, although other methods of cutting the material are also contemplated. In some embodiments, the first 216 and second 218 panels can be cut in a substantially rectangular configuration; although other geometrical and non-geometrical shapes are also contemplated. For example, in one embodiment, the first 216 and second 218 panels can be cut to generally measure about 12.75 inches by about 20.5 inches; about 13.75 inches by about 22.5 inches; about 15.5 inches by about 22 inches; about 17.5 inches by about 23.5 inches, or various combinations thereof.

The material can be selected from a variety of natural and synthetic materials, such as padded textiles or leather. For example, in some embodiments, the material can be wool felt; although other materials such as leather or a synthetic material (e.g., polyester wool) can be used. In some embodiments, the material can have a thickness of between about 2 mm to about 3 mm; although other thicknesses are also contemplated. In some embodiments, the durability of non-woven textiles (e.g., wool felt, polyester wool, etc.) may be preferred; as such fabrics generally lend themselves to being die-cut to an exact size, and tend to resist fraying along the edges 208A-D.

Polyester wool is typically constructed of a polyethylene terephthalate (PET) plastic, which is considered a non-biodegradable material. Although such synthetic materials are generally less expensive than a natural wool material, the touch and texture of an all-natural fibers (e.g., wool fabric) presents an appealing contrast to the glass in aluminum construction of most portable computing devices. Natural wool also has natural antimicrobial properties, as bacteria tend to be attracted to positively charged surfaces like those on synthetic fibers rather than the neutrally charged surface of Merino wool fibers. Further, lanolin, the naturally occurring waxy coating on wool fibers makes wool generally water repellent and stain resistant. Natural wool felt also provides a dense padded material to cushion items contained within the protective folio sleeve 200, as natural wool felt is well-suited to absorb and dissipate shock and other external forces.

Figure 6:
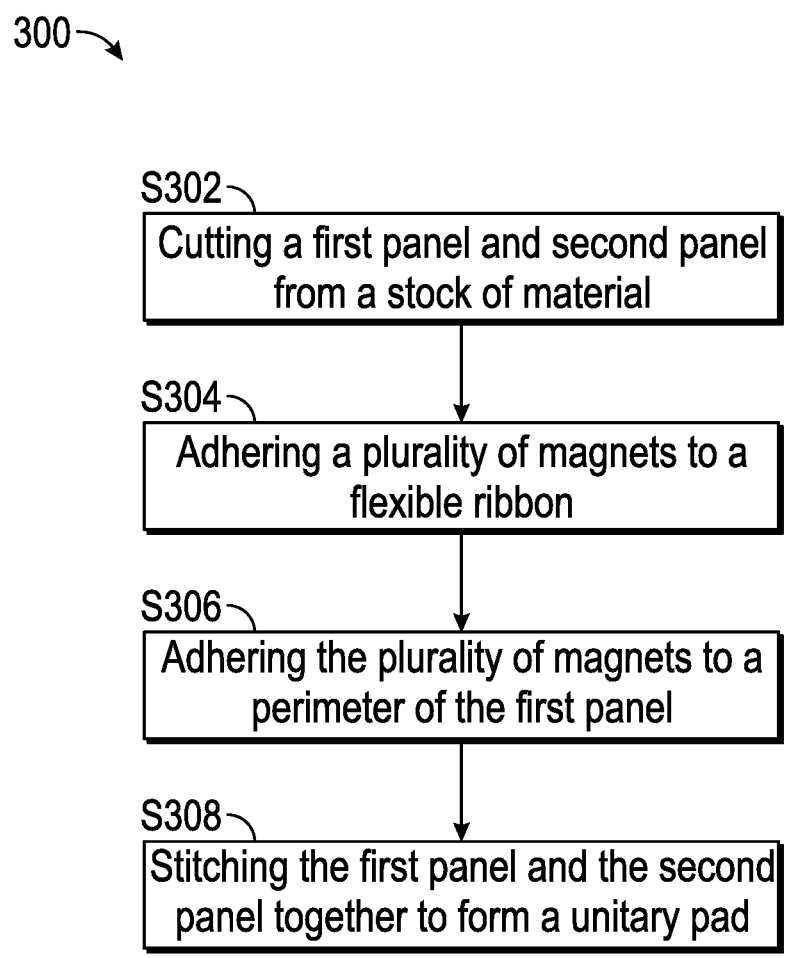
FIG. 6 is a flowchart depicting a method of constructing a protective folio sleeve, in accordance with an embodiment of the disclosure.

With continued reference to FIG. 6, at S304 a magnetic material can be assembled. For example, with additional reference to 7A, the magnetic material 220 can be comprised of a plurality of magnets 222 operably coupled to a flexible ribbon 224, which in turn can be operably coupled to at least one of the first 216 and/or second 218 panels. In some embodiments, the magnets can be relatively thin magnets measuring about 1 inch long by about ¼ inch wide, with a depth of about 1/16 of an inch; although the use of other magnets is also contemplated. In some embodiments, the length of the magnets 222 can be selected to freely articulate with the material when transitioning between the flat, open desk mat configuration and the sealed pouch configuration, thereby creating a zipper-like effect as the protective folio sleeve 200 opens and closes. In some embodiments, the magnets 222 can be high strength, N52 grade magnets and/or have a residual flux density of between about 12,000 and about 15,000 Gauss; although the use of magnets with other field strengths is also contemplated.

At S306, the magnetic material can be adhered to a perimeter 206 of at least one of the first 216 and/or second 218 panels. With additional reference to FIG. 7B, in some embodiments, edges 208A1, 208B and 208C1 can be lined with magnets 222, such that the magnetic field of the magnets 222 positioned along these edges are arranged such that the polarity is uniformly oriented in a first direction, while edges 208A2, 208D and 208C2 can be lined with magnets 222, such that the magnetic field of the magnets 222 positioned along these edges are arranged such that the polarity is uniformly oriented in a second direction opposite to the first direction, such that edges 208A1, 208B and 208C1 are naturally attracted to edges 208A2, 208D and 208C2 and vice versa (e.g., the S-N pole pairs are positioned proximate each when the protective folio sleeve 200 is in the sealed pouch configuration). In another embodiment, the polarity of the magnets 222 arranged along the perimeter 206 of the first 216 and/or second 218 panels can be alternated (e.g., the plurality of magnets can alternate between a North and South polarity along a given line), provided that the corresponding mirror image magnetic 222, opposite fold line 212, has a reversed polarity, such that the magnets 222 generally serve to naturally align edges 208A1, 208B and 208C1 with 208A2, 208D and 208C2, as they are attracted together. In yet another embodiment, magnets 222 can be positioned along first edges 208A1, 208B and 208C1, and a ferritic material can be positioned along second edges 208A2, 208D and 208C2, or vice versa, such that edges 208A1, 208B and 208C1 are naturally attracted to edges 208A2, 208D and 208C2.

In some embodiments, the flexible ribbon 224 can be in adhesive tape, such as an industrial carpet tape or other adhesive well adapted for wool felt; although other types of flexible ribbon 224 are also contemplated. In other embodiments, the plurality of magnets 222 can be adhered directly to the first 216 and/or second 218 panels, or otherwise stitched into the first 216 and/or second 218 panels during construction. In yet other embodiments, the magnetic material 220 can comprise a composite magnetic flexible ribbon, such as a magnetic tape, which can be adhered to the first 216 and/or second 218 panels.

Figure 7D:
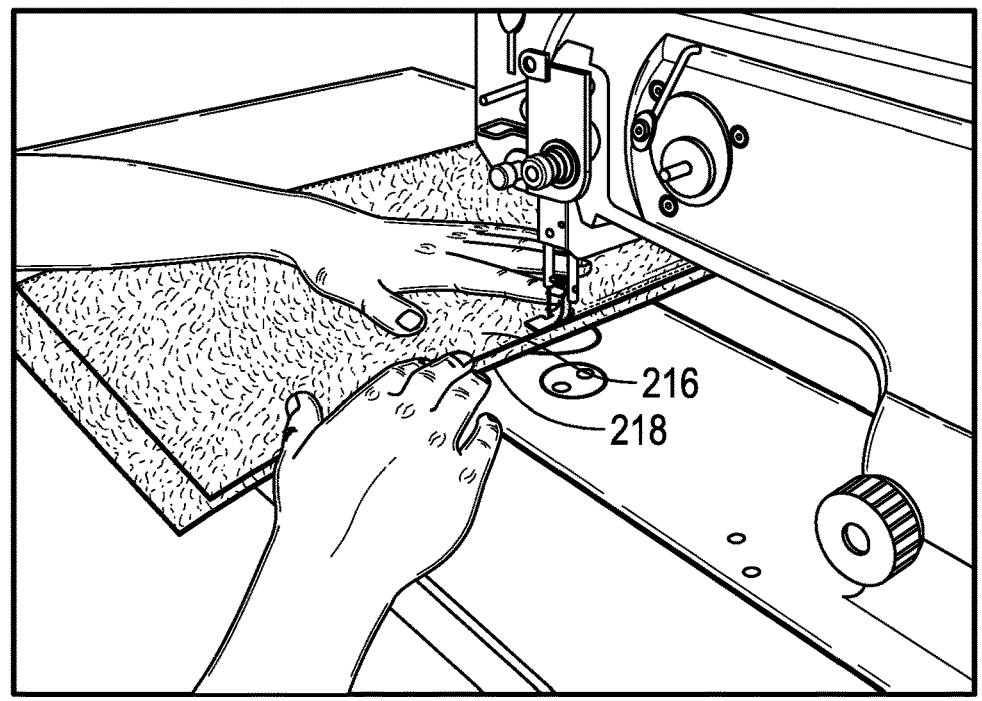
FIG. 7D is a schematic view depicting a step of stitching the first panel to the second panel, in accordance with an embodiment of the disclosure.

With continued reference to FIG. 6, at S308, the first 216 panel and the second 218 panels can affixed to one another. For example, with additional reference to FIG. 7D, the first panel 216 and the second panel 218 can be stitched together with a high strength thread, such as a polyester thread along the perimeter 206 of the protective folio sleeve 200. For example, in some embodiments, the stitching can be positioned about ¼ of an inch inward from the edges 208A-D of the protective folio sleeve 200. In some embodiments, one or more logos, designs, or emblems 226, can be positioned between the first 216 panel and the second 218 panels prior to stitching, with a corresponding aperture defined within at least one of the first 216 panel and the second 218 panels for display of the logo, design, and/or emblem. In some embodiments, an optional step of trimming the edges 208 of the protective folio sleeve 200 can be completed after the first and second panels 216, 218 have been stitched together, thereby providing a clean, uniform looking perimeter 206.

It should be appreciated that a more detailed explanation of the components of the protective folio sleeve 200, instructions regarding how to construct and use the various components of the protective folio sleeve 200, and certain other items and/or techniques necessary for the implementation and/or operation of the various components of the protective folio sleeve 200 are not provided here and because such components are commercially available and/or such background information is known to one of ordinary skill in the art. Therefore, it is believed that the level of description provided herein is sufficient to enable one of ordinary skill in the art to understand and practice the systems, methods and/or apparatuses as described herein. Further, should be understood that the individual steps used in the methods of the present teachings may be performed in any order and/or simultaneously, as long as the teaching remains operable. Moreover, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A method of constructing a protective folio sleeve, comprising:
    cutting a first panel and a second panel from a stock of material, wherein the first panel and the second panel are cut in a rectangular shape having a first half and a second half bisected by a fold line, the stock of material comprising a non-woven material having a thickness of between about two millimeters and about three millimeters;
    adhering a plurality of magnets to a flexible ribbon to form six lines of magnets;
    adhering the six lines of magnets in proximity to a perimeter of the first panel, wherein three lines of magnets are positioned on the first half of the first panel and the other three lines of magnets are positioned on the second half of the first panel; and
    stitching the first panel and the second panel together to form a unitary pad,
    wherein a total number of the plurality of magnets comprises an even number of magnets, with half of the plurality of magnets arranged on one side of the fold line and the other half of the plurality of magnets arranged an opposing side of the fold line, wherein a polarity of each magnet on one side of the fold line is opposite to a polarity of a corresponding magnet on the opposing side of the fold line, and wherein the polarity of each magnet in the line of magnets is opposite to a polarity of an adjacent magnet in the line of magnets, such that collectively the plurality of magnets are configured to passively align and attract edges of the unitary pad as the unitary pad transitions from a flat, open desk mat configuration to a sealed pouch configuration.

2. The method of claim 1, wherein the stock of material comprises at least one of wool felt, polyester felt, or leather.

3. The method of claim 1, wherein the magnets comprise N52 grade magnets.

4. The method of claim 1, wherein the magnets comprise bar magnets measuring about 1 inch long by about ¼ inch wide, with a depth of about ¹⁄₁₆ of an inch.

5. The method of claim 1, wherein the flexible ribbon comprises an industrial carpet tape.

6. The method of claim 1, wherein the first panel and the second panel are stitched together with a polyester thread.

7. A protective folio sleeve configured to transition from a flat, open desk mat configuration to a sealed pouch configuration, comprising:
 a first flexible panel and a second flexible panel, wherein the first flexible panel and the second flexible panel are formed in a rectangular shape having a first half and a second half bisected by a fold line, the first flexible panel and the second flexible panel comprised of a non-woven material having a thickness of between about two millimeters and about three millimeters;
 a plurality of magnets adhered to a flexible ribbon to form six lines of magnets, the six lines of magnets positioned between the first panel and the second panel in proximity to a perimeter of the first and second flexible panels to collectively form a unitary pad, wherein three lines of magnets are positioned on the first half of the first and second flexible panels and the other three lines of magnets are positioned on the second half of the first and second flexible panels,
 wherein a total number of the plurality of magnets comprises an even number of magnets, with half of the plurality of magnets arranged on one side of the fold line and the other half of the plurality of magnets arranged an opposing side of the fold line, wherein a polarity of each magnet on one side of the fold line is opposite to a polarity of a corresponding magnet on the opposing side of the fold line, and wherein the polarity of each magnet in the line of magnets is opposite to a polarity of an adjacent magnet in the line of magnets, such that collectively the plurality of magnets are configured to passively align and attract edges of the unitary pad as the unitary pad transitions from the flat, open desk mat configuration to the sealed pouch configuration.

8. The protective folio sleeve of claim 7, wherein the stock of material comprises at least one of wool felt, polyester felt, or leather.

9. The protective folio sleeve of claim 7, wherein the magnets comprise N52 grade magnets.

10. The protective folio sleeve of claim 7, wherein the magnets comprise bar magnets measuring about 1 inch long by about ¼ inch wide, with a depth of about ¹⁄₁₆ of an inch.

11. The protective folio sleeve of claim 7, wherein the flexible ribbon comprises an industrial carpet tape.

12. The protective folio sleeve of claim 7, wherein the first panel and the second panel are stitched together with a polyester thread.

* * * * *